No. 877,887.                                PATENTED JAN. 28, 1908.
C. P. EBERSOLE.
CONTROLLER REGULATOR.
APPLICATION FILED SEPT. 1, 1904.

Witnesses:
Robert H. Weir
Edwin B. H. Tower, Jr.

Inventor:
Cyrus P. Ebersole.
By Jones & Addington
Attorneys

UNITED STATES PATENT OFFICE.

CYRUS P. EBERSOLE, OF KEOKUK, IOWA, ASSIGNOR, BY MESNE ASSIGNMENTS, TO ELECTRIC SERVICE SUPPLIES COMPANY, OF PHILADELPHIA, PENNSYLVANIA, A CORPORATION OF NEW JERSEY.

CONTROLLER-REGULATOR.

No. 877,887.

Specification of Letters Patent.

Patented Jan. 28, 1908.

Application filed September 1, 1904. Serial No. 223,020.

*To all whom it may concern:*

Be it known that I, CYRUS P. EBERSOLE, a citizen of the United States, residing at Keokuk, in the county of Lee, and State of Iowa, have invented new and useful Improvements in Controller-Regulators, of which the following is a full, clear, concise, and exact description, reference being had to the accompanying drawing, forming a part of this specification.

The present invention relates to improvements in electric motor controllers, and especially to means for regulating the operation of the same.

Where an electric motor controller is employed to control an electric motor which propels an electric vehicle, or which operates in other relations where it starts under load, the operator may move the operating handle or member of the controller at such a rate in starting the motor that, unless the rate of movement of the handle of the controller be regulated, a large current will be admitted to the motor before the speed thereof has accelerated, thereby wasting considerable energy and subjecting the motor to an excessive current.

The present invention has for the object thereof to provide a regulator for an electric motor controller which will prevent the operator from moving the operating member or handle of the controller too rapidly in starting the motor.

In accordance with the present invention in the preferred form thereof, the operating member of the controller has associated therewith a series of stops arranged in succession and a pawl adapted to engage said stops. At each position of the operating member in starting the motor, the pawl engages a stop and prevents said member from being moved to the next postition until it is released by manually actuating a releasing mechanism.

Figure 1:
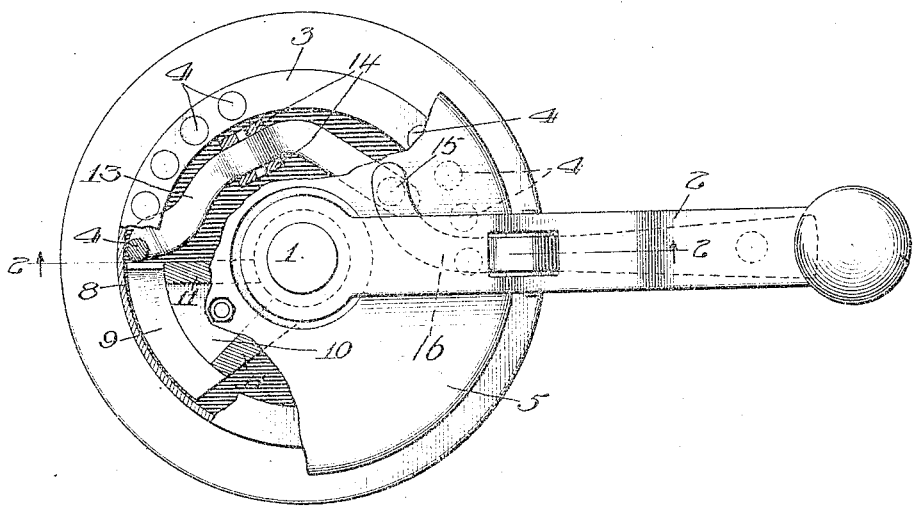
Figure 2:
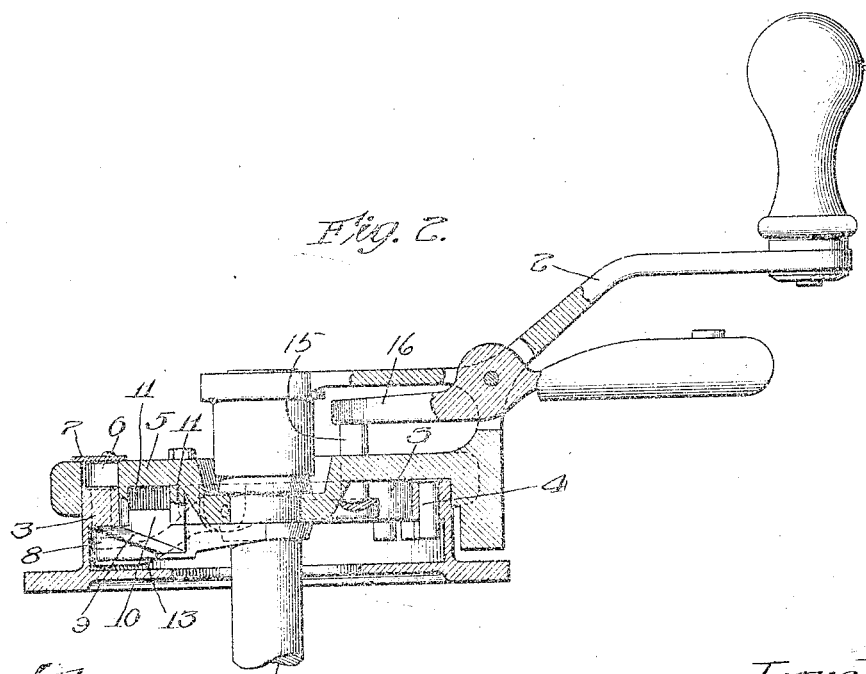

An embodiment of the present invention has been illustrated in the accompanying drawings, in which Figure 1 is a plan view of a controller regulator constructed in accordance with the present invention, parts of the regulator being broken away; and, Fig. 2 is a sectional view on the line 2—2 of Fig. 1.

The controller shaft 1 has attached thereto an operating handle 2 and surrounding the same is a supporting ring 3, which may be mounted in a stationary position upon the casing of the controller. This ring supports a plurality of stops or pins 4, which are arranged in succession. These pins extend through holes in said ring and have the lower ends thereof extending below said ring. The upper ends of said pins are provided with flanges, which rest in depressions around the holes.

Upon the controller shaft is mounted a plate or disk 5, which extends over the supporting ring and has a flange extending around said ring. This plate has a hole 6 therein covered by a plate 7 and adapted to permit the pins to be raised. The plate 5 supports a pawl or stop block 8, which preferably has an inclined or beveled rear surface constituting a cam 9, this pawl being provided with a projection 10 arranged between lugs 11, depending from the bottom of the plate. The pawl is arranged to engage the stop pins when the operating handle is moved from the initial position thereof, and engages a pin at each position of the operating handle to arrest the movement of the handle.

A releasing lever 13 is pivoted to lugs 14 depending from the plate 5 and has the forward end thereof situated in front of the pawl or stop block and adapted to pass beneath the lower ends of the pins. The rear end of the releasing lever has a plunger 15 resting thereon. The upper end of this plunger extends through the plate or disk 5 and engages a trigger 16 pivoted upon the operating handle of the controller.

When the operating handle is moved forward from the initial position thereof to start the motor, the pawl comes into engagement with the first pin 4 when it reaches the first position thereof, and thus the movement of the handle is arrested. The trigger may then be actuated to operate the releasing lever and thereby elevate the pin in engagement with the pawl to permit the operating handle to be turned until it reaches the next position thereof. The stop pins are arranged to arrest the movement of the operating handle at each position thereof, and prevent the operating handle from being moved from one position to the next until the trigger has been actuated to release the handle. In reversing the handle to stop the motor, it will be noted that the beveled rear surface 9 of the stop block will engage beneath the pins 4, raising the same as the pawl passes beneath the pins, whereby they will not interrupt the movement of the controller handle. By this arrangement the controller has an uninterrupted movement in the reverse direction.

It is manifest that the present invention is susceptible of being embodied in various forms, and, therefore, it will be understood that the embodiment of the invention which has been illustrated herein may be modified in various ways.

Having described my invention what I claim as new and desire to secure by Letters Patent is:

1. In combination, a controller operating member, an annular support, a series of movable stops depending from said support, a pawl arranged beneath said stops and engaging the same to enforce an intermittent movement of said operating member and locking the same in the position of rest, manually operated means for moving said stops to release said member, and a cover fitting over said annular member whereby the operative parts are entirely inclosed.

2. The combination, with a controller operating member, of a series of movable stops, a pawl arranged beneath and engaging said stops to enforce an intermittent movement of said member and locking said member in the positions of rest, and manually operated means for moving said stops to release said member.

3. The combination, with a controller operating member, of a series of movable stops mounted upon a stationary support, a pawl movable with said member beneath said stops and engaging the same to enforce an intermittent movement of said member and locking said member in the positions of rest, and manually operated means for moving said stops to release said member.

4. The combination, with a controller operating member, of a plurality of stops arranged in succession, a pawl movable with said member beneath said stops and arranged to engage the same and thereby arrest the movement of said member, and manually operated means for removing said stops from engagement with said pawl to release said member.

5. The combination, with a controller operating member, of a plurality of pins movable in a suitable stationary support, a pawl movable with said member beneath said pins and arranged to engage the same to arrest the movement of said member, and manually operated mechanism for removing said pins from engagement with said pawl to release said member.

6. The combination, with a controller operating member, of a plurality of movable stops arranged upon a stationary support, a pawl movable with said member beneath said stops and arranged to engage the same to arrest the movement of said member, and a lever movable with said member and adapted to be manually operated to remove said stops from engagement with said pawl to release said member.

7. In combination, a controller shaft, an operating handle therefor, a stationary support extending around said shaft, a plurality of movable stops arranged in succession upon said support, a member movable with said shaft, a stop block carried by said member beneath said stops and arranged to engage the same, and means also carried by said movable member for removing said stops from engagement with said block.

8. In combination, a controller shaft, an operating handle therefor, a stationary support surrounding said shaft, a plurality of movable stops arranged in succession upon said support, a member movable with said shaft, a stop block arranged beneath said stops and carried by said member and adapted to engage said stops to arrest the movement of said shaft when the shaft is moved in one direction and to operate said stops to permit said shaft to be moved freely in the opposite direction, and mechanism carried by said member adapted to be manually actuated to remove said stops from engagement with said block to release said shaft.

9. In combination, a controller shaft, an operating handle therefor, a stationary support extending around said shaft, a plurality of movable stops arranged in succession upon said support, a plate movable with said shaft, a stop block mounted upon said plate and movable in alinement with said stops, a lever carried by said plate for operating said stops to remove the same from engagement with said block and a trigger for operating said lever.

10. In combination, a controller shaft, an operating handle therefor, a stationary support surrounding said shaft, a plurality of pins slidably mounted in said support, a plate extending over said ring having a recess to receive said pins, a stop block carried by said plate and movable in alinement with said pins, a lever adapted to pass beneath said pins arranged in front of said block, and a trigger for operating said lever to raise said pins.

11. In a controller regulator, the combination with a plurality of vertically sliding pins, of a stop for engaging said pins when said stop is moved in one direction, and a cam surface for engaging said pins to move the same out of the path of said stop when said stop is moved in the opposite direction.

12. In a controller regulator, the combination with a plurality of vertically reciprocating members, of a stop arranged to engage said members when said stop is moved in one direction, manually operated means for disengaging said members from said stop, and a cam surface for moving said members out of the path of said stop when said stop is moved in the opposite direction.

13. The combination with an annular stationary member, of a plurality of vertically reciprocating pins carried thereby, of a stop rotatable relative to said pins and arranged to successively engage the same when said stop is moved in one direction, manually operated means to cause the disengagement of each of said members from said stop, and a cam surface for engaging said pins to move the same out of the path of said stop when said stop is moved in the opposite direction.

14. The combination with a controller operating member, of a series of vertically sliding stops, a pawl engaging said stops to interrupt the movement of said member when moved in one direction, locking said member in a position of rest, manually operated means for moving said stops to release said member, and a cam surface for engaging said stops to move the same out of the path of said pawl when said handle is moved in the opposite direction.

15. In a controller regulator, the combination with a plurality of vertically reciprocating pins, of a stop for engaging said pins, and means for raising said pins out of the path of said stop, said pins being movable by gravity back to their normal position.

16. In a controller regulator, the combination with a plurality of sliding pins, of a stop for engaging the same, manually operated trigger mechanism and cam mechanism for sliding each of said pins out of the path of said stops.

17. The combination with a controller operating member, of a series of sliding stops, a pawl for engaging said stops to interrupt the movement of said member, locking said member in position of rest, and manually operated means for sliding said stops to permit said member to rotate in one direction, said pawl having a cam surface to slide said stops out of the path thereof when moved in the opposite direction.

18. In a controller regulator, the combination with an actuating handle, of a stop lug operating therewith, a plurality of vertically sliding plungers depending in the path of said stop lug, manually operated means for raising said plungers out of the path of said stop lug when the handle is rotated in one direction and a cam surface for raising said plungers out of the path thereof when the handle is rotated in the opposite direction.

19. In a controller regulator, the combination with a pawl member operating with the controller handle, of a plurality of vertically sliding stops normally disposed by gravity in the path of said pawl, said pawl being formed to positively engage said stop when moved in one direction and when moved in the opposite direction to raise said stops out of the path thereof and manually operative means for raising said stops.

20. In a controller regulator, the combination with a plurality of vertically sliding abutments, of a stop operating with the controller handle into the path of which said abutments normally depend, means for raising said abutments out of the path of said stop when said handle is moved in one direction and a cam surface for raising said abutments out of the path of said stop when the handle is moved in the opposite direction.

In witnesses whereof, I have hereunto subscribed my name in the presence of two witnesses.

CYRUS P. EBERSOLE.

Witnesses:
G. W. Cox,
C. A. Loeffler.